United States Patent
Hayashi (10) Patent No.: US 8,081,333 B2
(45) Date of Patent: Dec. 20, 2011

(54) IMAGE TRANSMITTING APPARATUS AND IMAGE TRANSMITTING METHOD

(75) Inventor: Takahiko Hayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1181 days.

(21) Appl. No.: 11/743,924

(22) Filed: May 3, 2007

(65) Prior Publication Data

US 2007/0263262 A1  Nov. 15, 2007

(30) Foreign Application Priority Data

May 11, 2006 (JP) .................. 2006-132139

(51) Int. Cl.
*G06F 3/12* (2006.01)
*H04N 1/04* (2006.01)
(52) U.S. Cl. ...................... 358/1.15; 358/474
(58) Field of Classification Search ............... 358/1.15, 358/400, 1.9, 401, 442, 448, 462, 474
See application file for complete search history.

(56) References Cited

U.S. PATENT DOCUMENTS

| 6,611,242 B1 * | 8/2003 | Hongo et al. ............. 345/2.1 |
| 7,140,534 B2 * | 11/2006 | Miyazawa et al. ......... 235/375 |
| 2002/0080931 A1 * | 6/2002 | Yamamoto et al. ....... 379/90.01 |

FOREIGN PATENT DOCUMENTS

| JP | 3621180 | 11/2004 |
| JP | 2005-12829 | 1/2005 |

OTHER PUBLICATIONS

U.S. Appl. No. 11/681,929, filed Mar. 5, 2007, Takahiko Hayashi.

* cited by examiner

*Primary Examiner* — Jerome Grant, II
(74) *Attorney, Agent, or Firm* — Oblon, Spivak, McClelland, Maier & Neustadt, L.L.P.

(57) ABSTRACT

An image transmitting apparatus includes a reading condition determining unit that determines whether a first reading condition is satisfied that the first reading conditions contain compulsory information indicating compulsory use of that condition, and a second condition is satisfied that the first reading conditions are contradicting to each other. When both the first condition and the second condition are satisfied, the reading condition determining unit sets one of the first reading conditions as a reading condition for reading image data.

11 Claims, 8 Drawing Sheets

FIG. 6

IMAGE TRANSMITTING APPARATUS AND IMAGE TRANSMITTING METHOD

CROSS-REFERENCE TO RELATED APPLICATIONS

The present document incorporates by reference the entire contents of Japanese priority document, 2006-132139 filed in Japan on May 11, 2006.

BACKGROUND OF THE INVENTION

1. Field of the Invention

The present invention relates to an image transmitting apparatus that transmits image data to an external apparatus, image transmitting apparatus controlling method, and program product.

2. Description of the Related Art

Image transmitting apparatuses that transmit read image data to a communicable external apparatus through a network have been known.

A known example of such image transmitting apparatuses is a network scanner apparatus as disclosed in Japanese patent No. 3621180 (hereinafter, "first document"), in which scan conditions, such as a reading resolution, transmitted in advance from a client apparatus as an image transmission destination are stored for selection and, when a password set for each client terminal is entered, an image is read under the stored conditions and is transmitted to the client terminal.

The first document also discloses a network scanner apparatus including an operation panel that allows scan conditions and a client terminal as a transfer destination to be specified from a menu, thereby allowing transmission of an image read under the scan conditions specified through the operation panel to the transfer destination also specified through the operation panel.

Furthermore, a network scanner has been known as disclosed in Japanese Patent Application Laid-Open No. 2005-12829, in which a Tool Without An Interesting Name (TWAIN) driver supporting network connection is used for reading so as to allow reading conditions to be set on an image transmitting apparatus from an information processing apparatus as a transmission destination of image data.

Meanwhile, in recent years, when an image read by an image transmitting apparatus is transmitted to an information processing apparatus, such as a personal computer (PC), the image transmitting apparatus can access the transmission destination apparatus to obtain image reading conditions required thereby.

If the image transmitting apparatus has such a function, the image transmitting apparatus can read an image automatically under conditions suitable for the transmission destination apparatus and then transmit read image data. Therefore, operability of the image transmitting apparatus can be increased.

However, when the image transmitting apparatus transmits image data to a plurality of apparatuses, the set reading conditions may not coincide with one another among the transmission-destination apparatuses. In that case, if the image transmitting apparatus cannot appropriately handle this situation, it is impossible to appropriately transmit image data to the transmission destination, thereby posing a problem of impairing convenience of the image transmitting apparatus. Moreover, a control scheme for allowing an appropriate operation to be performed if the conditions do not coincide with each other has not been conventionally known.

SUMMARY OF THE INVENTION

It is an object of the present invention to at least partially solve the problems in the conventional technology.

According to an aspect of the present invention, an image transmitting apparatus includes a reading condition obtaining unit that obtains a first reading condition relating to an image from each of a plurality of external apparatuses via a network; a reading condition determining unit that determines whether a first condition is satisfied that the first reading conditions contain compulsory information indicating compulsory use of that condition and a second condition is satisfied that the first reading conditions are contradicting to each other, and when both the first condition and the second condition are satisfied, sets one of the first reading conditions as a reading condition; an image reading unit that reads an image under the reading condition set by the reading condition determining unit thereby obtaining image data; and an image transmitting unit that transmits the image data to at least one of the external apparatus.

According to another aspect of the present invention, an image transmitting apparatus includes a reading condition obtaining unit that obtains a first reading condition relating to an image from each of a plurality of external apparatuses via a network; a reading condition determining unit that determines whether a first condition is satisfied that the first reading conditions contain compulsory information indicating compulsory use of that condition and a second condition is satisfied that the first reading conditions are contradicting to each other, and when both the first condition and the second condition are satisfied, sets one of the first reading conditions as a reading condition; an image reading unit that reads an image under the reading condition set by the reading condition determining unit thereby obtaining image data; an image transmitting unit that transmits the image data to at least one of the external apparatus; and a transmission suspending unit that suspends transmission of the image data by the image transmitting unit when the first condition is satisfied but the second condition is not satisfied.

According to still another aspect of the present invention, a method of transmitting an image includes obtaining a first reading condition relating to an image from each of a plurality of external apparatuses via a network; determining whether a first condition is satisfied that the first reading conditions contain compulsory information indicating compulsory use of that condition and a second condition is satisfied that the first reading conditions are contradicting to each other; setting one of the first reading conditions as a reading condition when it is determined at the determining that both the first condition and the second condition are satisfied; reading an image under the reading condition set at the setting thereby obtaining image data; and transmitting the image data to at least one of the external apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below while referring to accompanying drawings.

Figure 1:
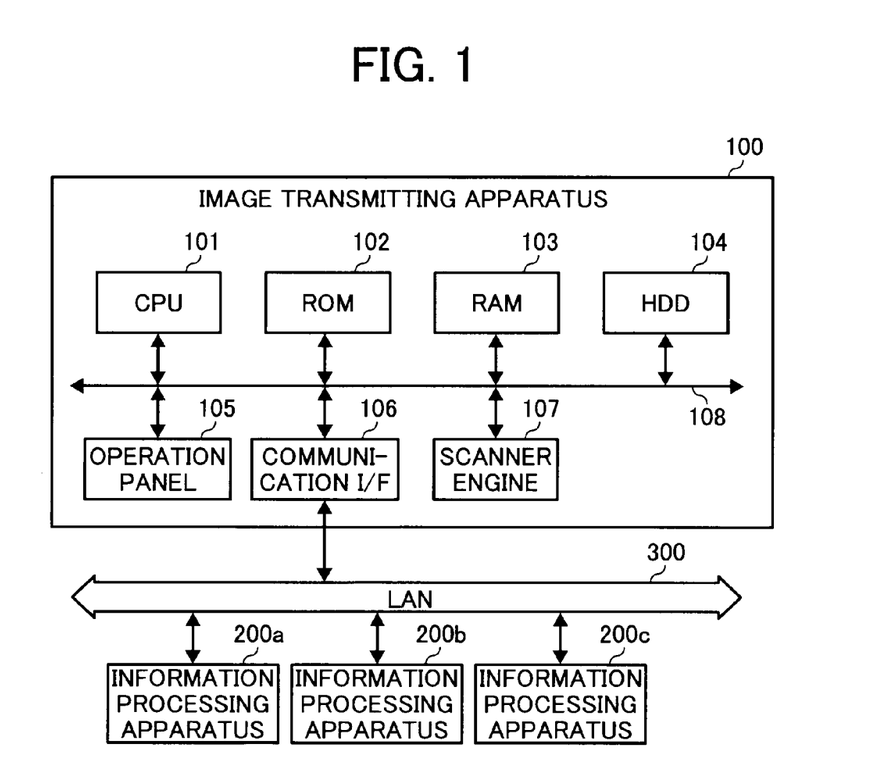
FIG. 1 is a block diagram of a hardware configuration of an image transmitting apparatus according to one embodiment.

First, a hardware configuration of an image transmitting apparatus 100 according to one embodiment is depicted in FIG. 1.

The image transmitting apparatus 100 includes a central processing unit (CPU) 101, a read-only memory (ROM) 102, a random access memory (RAM) 103, a hard disk drive (HDD) 104, an operation panel 105, a communication interface (I/F) 106, and a scanner engine 107, and these components are connected via a system bus 108.

Of these components, the CPU 101 is a controlling unit that controls over the entire image transmitting apparatus 100. With execution of various programs recorded on the ROM 102 and HDD 104, the CPU 101 functions as a reading condition obtaining unit, a comparing unit, a reading condition determining unit, and other units.

The ROM 102 is a non-volatile storage unit, storing programs executed by the CPU 101, fixed parameters, and others. The ROM 102 may be configured as a rewritable storage unit so that data stored therein can be updated.

The RAM 103 is a storage unit that temporarily stores data for use and is used as a work memory for the CPU 101.

The HDD 104 has stored therein various types of data, such as programs to be executed by the CPU 101, parameter values required to be retained even after the apparatus is powered off, and image data read by the scanner engine 107. In place of the HDD 104, another storage unit, such as an optical disk, may be used for the purpose mentioned above.

The operation panel 105 includes a displaying unit, such as a liquid crystal display (LCD) or a light-emitting diode (LED), and an operating unit, such as various keys and buttons or a touch panel laminated on the LCD. The displaying unit has displayed thereon an operation state, settings, a message, a graphical user interface (GUI) for accepting an operation, and others of the image transmitting apparatus 100. The operating unit accepts operations, such as a user's operation instruction and setting instruction to the image transmitting apparatus 100. Here, as a matter of course, the operating unit and the displaying unit do not have to be integrally provided.

The communication I/F 106 is an interface allowing the image transmitting apparatus 100 to communicate with other apparatuses via a communication path and can be, for example, a network interface for connecting to a network, such as a local area network (LAN) 300, for Ethernet (registered trademark) communication. When the image transmitting apparatus 100 communicates with another apparatus, these communication I/F 106 and the CPU 101 function as a communicating unit. Here, the communication I/F 106 is provided according to communication path specifications, a communication protocol for use, and other factors. The communication path may be arbitrary irrespectively of wired or wireless and, as a matter of course, a plurality of communication I/Fs 106 can be provided according to a plurality of types of specifications.

The scanner engine 107 is an image reading unit that reads an image on a document placed on a reading table or fed by an automatic document feeder (ADF) to a reading unit or the like to obtain image data indicating that image. In response to a request from the CPU 101, reading can be performed under reading conditions, such as a specified document size, resolution, gray-scale, and others.

The image transmitting apparatus 100 as explained above is configured as, for example, a network scanner, in which, in response to an operation from a user, an image on a document is read by the scanner engine 107 and image data obtained through reading can be transmitted to a plurality of external information processing apparatuses 200a, 200b, and 200c (a reference numeral of 200 is used when these apparatuses are collectively referred to) communicable via the LAN 300. With the image transmitting apparatus 100 and the information processing apparatuses 200 as transmission destinations of image data, an image processing system can be formed.

When transmitting image data to any of the information processing apparatuses 200, the image transmitting apparatus 100 accesses an information processing apparatus 200 as an image data transmission destination so as to obtain image reading conditions therefrom, thereby performing reading according to the conditions. Also, even when reading conditions set among the image transmitting apparatuses 200 as transmission destinations do not coincide with one another, an appropriate operation in consideration of the reading conditions can also be performed.

As hardware, each information processing apparatus 200 can be configured by a known computer, such as a personal computer (PC) including a CPU, a ROM, a RAM, a HDD, a network I/F, and others.

Although not absolutely necessary, the information processing apparatus 200 can be provided with a function of notifying the image transmitting apparatus 100 of the presence of its own at the time of powered-on so as to mutually recognize the presence with each other and also registering the image transmitting apparatus 100 as a usable network scanner.

Next, the functions included in the image transmitting apparatus 100 and the operations to be performed by the image transmitting apparatus 100 are explained, mainly focusing on portions associated with setting of reading conditions and image data transmission as explained above.

Figure 2:
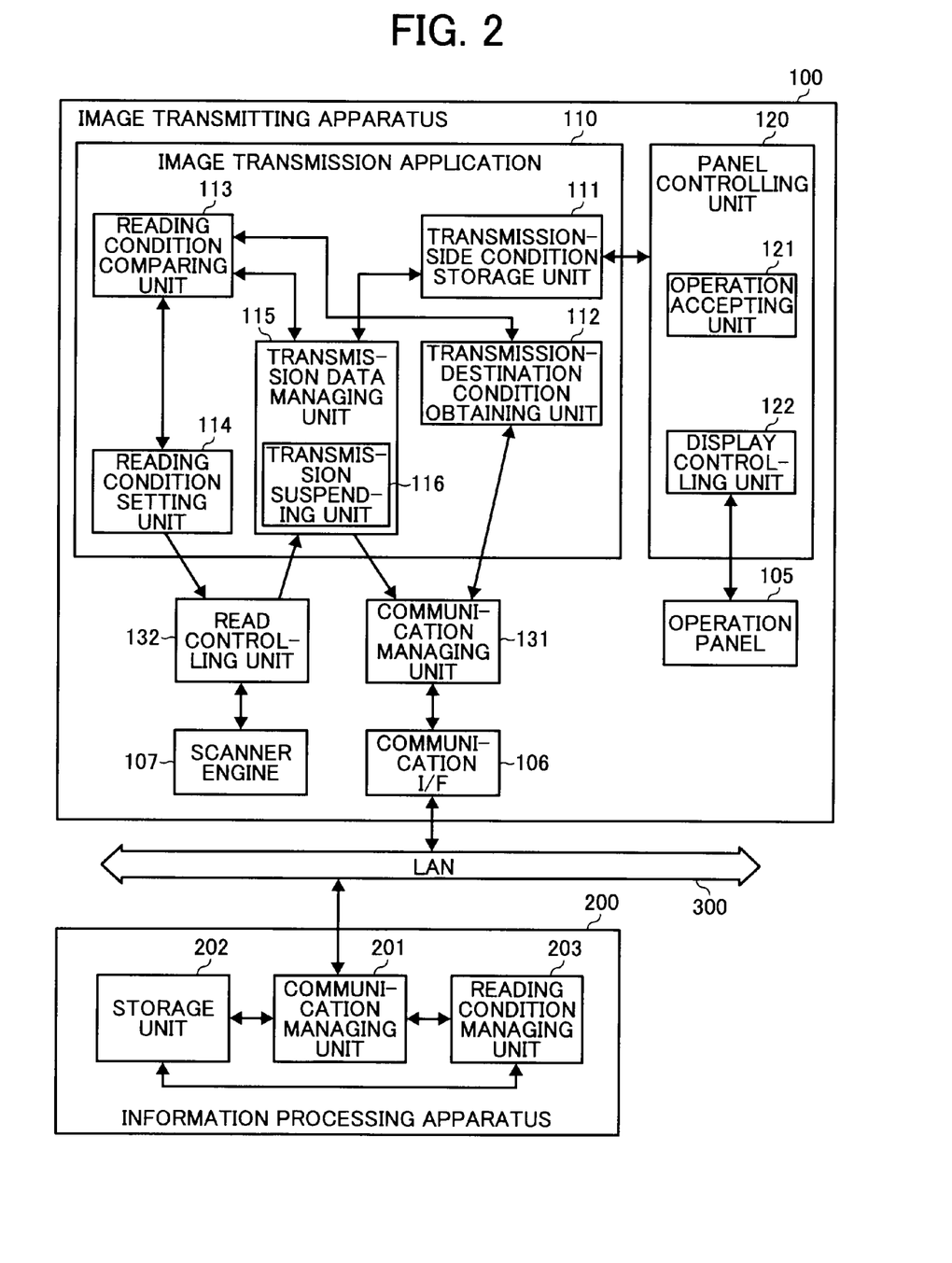
FIG. 2 is a functional block diagram of portions associated with setting of reading conditions and image data transmission in the image transmitting apparatus and an information processing apparatus depicted in FIG. 1.

FIG. 2 is a functional block diagram of portions associated with setting of reading conditions and image data transmission in the image transmitting apparatus 100 and an information processing apparatus 200. Here, although only one information processing apparatus 200 is depicted in this drawing, other information processing apparatuses 200 have functions similar to those depicted in the drawing.

As depicted in the drawing, as functional units having functions associated with setting of reading conditions and image data transmission, the image transmitting apparatus 100 includes an image transmission application 110, a panel controlling unit 120, a communication managing unit 131, and a read controlling unit 132. Each of these functions is achieved by the CPU 101 executing appropriate control software.

Of these units, the panel controlling unit 120, the communication managing unit 131, and the read controlling unit 132 are service modules having a function of controlling the operation panel 105, the communication I/F 106, and the scanner engine 107 in FIG. 1, respectively. In response to a request from an application having a control right over these hardware, hardware control is performed, an operation according to the request is performed, and the received or detected data is passed to the application.

More specifically, the panel controlling unit 120 includes an operation accepting unit 121 that detects an operation at an operating unit and causes the operation to be reported to the application having a control right over the operation panel 105, and a display controlling unit 122 that controls a displaying unit and causes the details specified by an application using the operation panel 105 to be displayed. The display controlling unit 122 includes a prohibiting unit 123 that prohibits an operation of the operating unit.

The communication managing unit 131 has a function of transmitting through the communication I/F 106 data requested by the application for transmission to a specified transmission destination, and also has a function of passing data transmitted from an external apparatus to the communication I/F 106 to an application that should process the data, according to destination information attached to the data and the contents of the data.

The read controlling unit 132 has a function of controlling the scanner engine 107 in response to a request from an application having a control right over the scanner engine 107, and causing an image on a document to be read according to specified reading conditions and then passing image data obtained through reading to the application.

On the other hand, the image transmission application 110 is an application for achieving in the image transmitting apparatus 100 a function of reading the image on the document according to a user's instruction for transmission to a specified transmission destination by issuing various request to the service modules, such as the panel controlling unit 120, the communication managing unit 131, and the read controlling unit 132 to cause them to control the hardware. Here, as such an application, only the image transmission application 110 is provided. Alternatively, another application can be provided. For this purpose, an arbitrating unit that arbitrates a request from an application to a service module can be provided.

The image transmission application 110 includes functions of a transmission-side condition storage unit 111, a transmission-destination condition obtaining unit 112, a reading condition comparing unit 113, a reading condition setting unit 114, and a transmission data managing unit 115.

Of these units, the transmission-side condition storage unit 111 has a function of storing destination conditions indicative of a transmission destination of the read image data. As this destination information, information regarding a plurality of transmission destinations can be set. Specifically, such information can be specified with an Internet protocol (IP) address, for example, and can be set by using an address book or the like not shown, for example. Also, the destination information can be set through the operation panel 105, or can be set through an access from an external apparatus (which may be the information processing apparatus 200)) communicable through a network to the image transmitting apparatus 100 by using a web browser or client software.

The transmission-destination condition obtaining unit 112 is a reading condition obtaining unit. For transmitting image data to an external apparatus, the transmission-destination condition obtaining unit 112 has a function of accessing the external apparatus as a transmission destination through the communication managing unit 131 and obtaining information about reading conditions set in this external apparatus. Such reading conditions are set on the external apparatus side as reading conditions that should be set in an apparatus that transmits image data at the time of reading the image data for transmission.

When a plurality of transmission destinations are set, reading conditions are obtained from each of the transmission destinations.

The reading condition comparing unit 113 serves as a reading condition determining unit, and has a function of comparing reading conditions obtained by the transmission-destination condition obtaining unit 112 from a plurality of transmission destinations. As a result of comparison, based on the reading conditions obtained from the respective transmission destinations, priority information provided to the reading conditions obtained from the respective transmission destinations, and several settings regarding selection criteria on the image transmitting apparatus 100 side, it is determined which reading condition is used as a reading condition of the image data to be transmitted. The reading condition comparing unit 113 also has a function of reporting to the reading condition setting unit 114 the determined reading condition and whether to transmit the image data.

Furthermore, depending on the priority or the comparison result explained above, the reading condition comparing unit 113 may determine that image data transmission to all or part of the transmission destinations is suspended. In this case, such a determination is reported to the transmission data managing unit 115. Still further, it may be determined that reading itself is suspended. In that case, such a determination is reported to the reading condition setting unit 114.

The reading condition setting unit 114 has a function of setting the reading conditions reported from the reading condition comparing unit 113 in the read controlling unit 132 to cause the image on the document to be read according to the reading conditions.

The transmission data managing unit 115 serves as an image transmitting unit, includes a transmission suspending unit 116, and has a function of managing image data and image data transmission suspension notification that are to be transmitted to the transmission-destination apparatuses and requesting the communication managing unit 131 for transmission at the time of transmission. The transmission suspending unit 116 suspends transmission of image data or the like when the reading condition comparing unit 113 determines that transmission is to be suspended.

Still further, the information processing apparatus 200 includes, as functional units with functions associated with setting of reading conditions and image data reception, a communication managing unit 201, a storage unit 202, and a reading condition managing unit 203. These functions are achieved by the CPU of the information processing apparatus 200 executing appropriate control software.

The communication managing unit 201 has a function of controlling the communication I/F and managing data communication with an external apparatus including the image transmitting apparatus 100.

The storage unit 202 has a function of controlling storage units, such as the RAM and the HDD, and causing data received from the external apparatus, and generated by the information processing apparatus 200 by itself, data entered by an input device not shown, such as a keyboard, and other data to be stored. The data includes image data, requests, notifications received from the image transmitting apparatus 100 and the reading conditions on the information processing apparatus 200 side.

The reading condition managing unit 203 has a function of managing reading conditions on the information processing apparatus 200 side, that is, conditions defined as conditions to be set at the time of reading image data for transmission from an apparatus that transmits the image data and, when an instruction for setting or changing a condition or priority is provided automatically or through a user's operation, changing the contents stored in the storage unit 202 according to the instruction. The reading condition managing unit 203 also has a function of, when a notification of image data transmission ready is provided from an external apparatus, such as the image transmitting apparatus 100, and it is then determined that image data can be received, returning the reading conditions and priority information on the information processing apparatus 200 side to the notification source.

Here, examples of settable priority information are compulsory information (Must) indicating that the use of the reading conditions on the information processing apparatus 200 side is compulsory for an apparatus that transmits the image data and arbitrary information (Want) indicating that the use of the reading conditions on the information processing apparatus 200 side is arbitrary. For each set of reading conditions, either one of these pieces of information can be set.

Next, the operation to be performed when the image transmitting apparatus 100 reads image data for transmission to a specified transmission destination (information processing apparatus 200) is explained.

As explained above, at the time of image data transmission, the image transmitting apparatus 100 accesses each of the information processing apparatuses 200 set as transmission destinations to obtain the reading conditions set in each of the information processing apparatuses 200. Then, if this obtainment is performed before reading image data, in consideration of the reading conditions and priorities obtained from the information processes apparatuses 200, appropriate reading conditions can be set within a range of the capability of the scanner engine 107.

Thus, before image reading, the image transmitting apparatus 100 obtains the reading conditions from the information processing apparatuses 200 set as transmission destinations.

Figure 3:
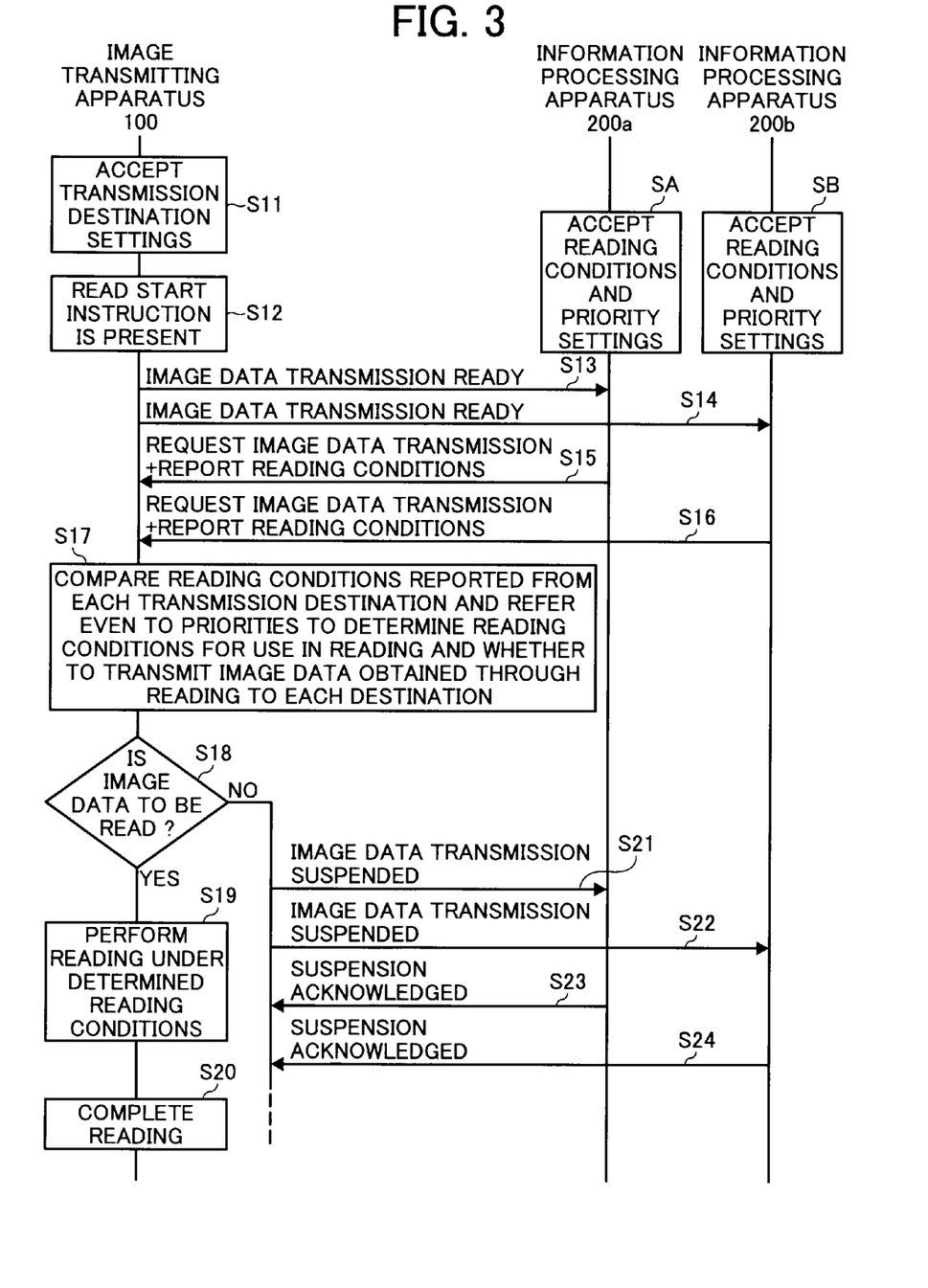
FIG. 3 is a sequence diagram of an operation example of the image transmitting apparatus and the information processing apparatus depicted in FIG. 1.
Figure 4:
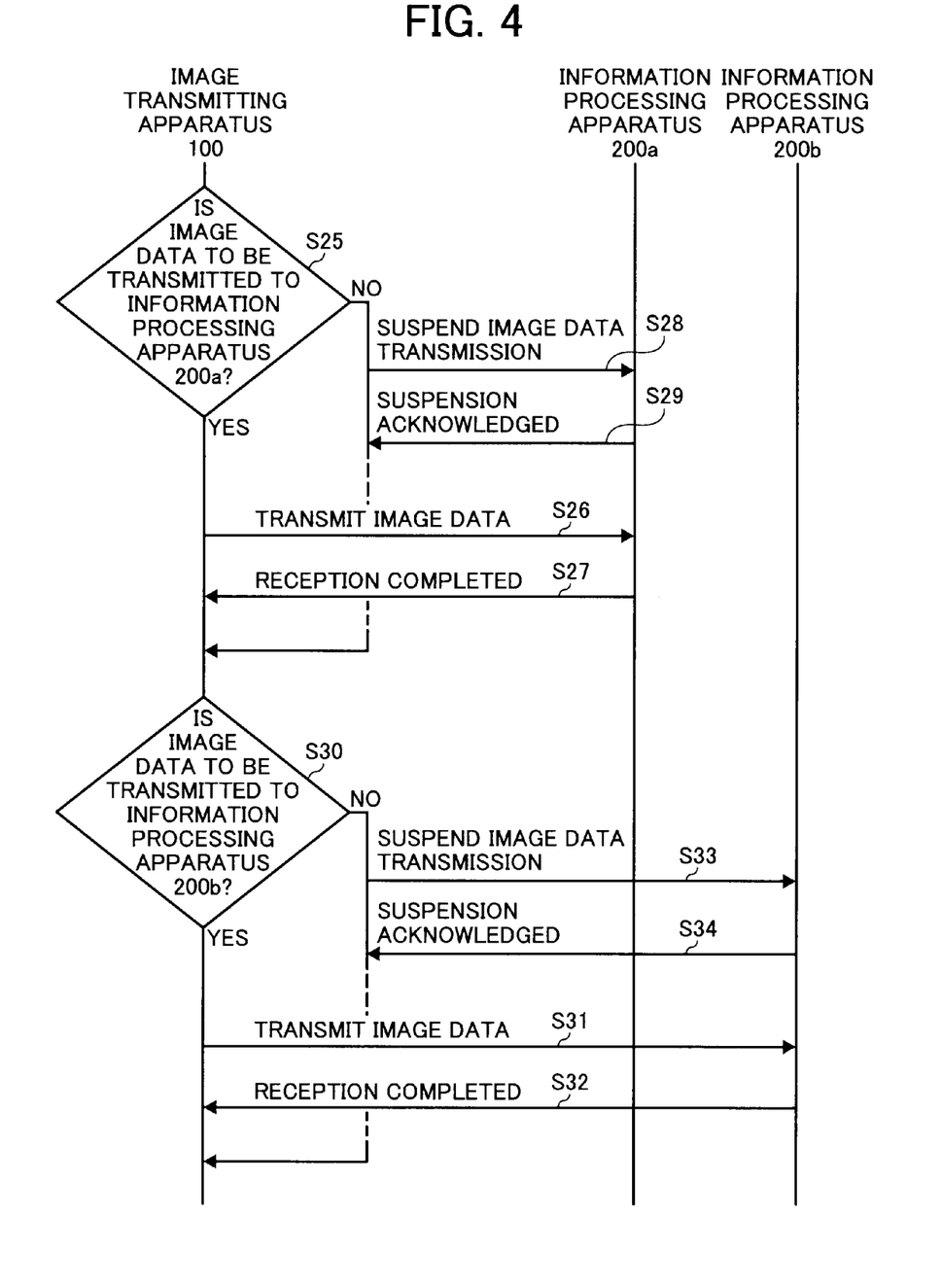
FIG. 4 is a sequence diagram of the operation example continued from FIG. 3.

FIGS. 3 and 4 depict an operation example of the image transmitting apparatus 100 and the information processing apparatuses 200 in this case. Here, in the image transmitting apparatus 100, two image processing apparatuses 200a and 200b are set as image data transmission destinations.

In this case, the image transmitting apparatus 100 accepts any time through the operation panel 105 the settings of the image data transmission destinations (S11). After these are set, upon detection of a read start instruction, such as a press of a start button (S12), a notification indicative of image data transmission ready is transmitted to each of the information processing apparatuses 200a and 200b set as transmission destinations (S13, S14).

On the other hand, the information processing apparatuses 200a and 200b accept any time the reading conditions and their priority settings (SA, SB). Upon reception of the notification indicative of image data transmission ready from the image transmitting apparatus 100, as a response, an image data transmission request is issued, and a notification indicative of the reading conditions and their priority set in the information processing apparatus 200 at that time is issued (S15, S16). These processes at steps S13 through S16 represent a reading condition obtaining process.

Upon receiving the reading condition notifications from all information processing apparatuses 200 set as transmission destinations, the image transmitting apparatus 100 compares the reading conditions transmitted from the transmission destinations and also refers to their priorities, thereby determining the reading conditions for use in reading and whether to transmit image data obtained through reading to the transmission destinations (S17). Criteria of this determination will be explained further below. The process at step S17 is a reading condition determining process.

After step S17, it is determined based on the determination whether to read image data (S18).

Then, if it is determined at step S18 to read image data, the scanner engine 107 is driven under the reading condition determined at step S17 for use in reading to obtain an image on the document so as to obtain image data (S19). Upon completion of reception (S20), the system control is passed to processes depicted in FIG. 4. The process at step S19 is a read controlling process.

On the other hand, upon determining at step S18 that reading is not to be performed, image data transmission will also be suspended. Therefore, the information processing apparatuses 200a and 200b set as transmission destinations are notified of image data transmission suspended (S21, S22). Upon reception of such notification, the information processing apparatuses 200a and 200b notify the image transmitting apparatus 100 of suspension acknowledged (S23, S24). Here, when it is determined at step S18 that transmission is not to be performed, settings may be changed in a manner such as reducing the number of transmission destinations so as to allow image data transmission, an operation for which is not explained herein.

In the process depicted in FIG. 4, the image transmitting apparatus 100 determines whether to transmit the read image data to the information processing apparatus 200a based on the determination at step S17 of FIG. 3 (S25). If it is determined to transmit, the image data obtained at step S19 is transmitted to the information processing apparatus 200a (S26). Upon completion of reception, the information processing apparatus 200a notifies the image transmitting apparatus 100 of reception completed (S27).

Here, reading may be performed at a plurality of times at step S19. In that case, it is also determined at step S17 under which reading condition and to which information processing apparatus 200 the image data is to be transmitted. Therefore, the image data is transmitted according to that determination. Also, in the process at step S26, the CPU 101 functions as an image transmitting unit.

If it is determined at step S25 that the image data is not to be transmitted, the image transmitting apparatus 100 notifies the information processing apparatus 200a of suspension of image data transmission (S28), similarly in the case of steps S19 and S21 of FIG. 3. Upon reception of the notification, the information processing apparatus 200a notifies the image transmitting apparatus 100 of suspension acknowledged (S29).

In either case, it is then determined whether the read image data is to be transmitted to the information processing apparatus 200b (S30). According to the determination, as with steps S26 to S29, the image data or an image data transmission suspension notification is transmitted to the information processing apparatus 200b, and a response is received therefrom (S31 to S34).

A series of processes associated with image data transmission are now completed.

In the processes depicted in FIGS. 3 and 4 above, the order of transmitting data from the image transmitting apparatus 100 to each of the information processing apparatuses 200 and receiving a response to the transmitted data is not restricted to the one depicted in the drawings.

For example, as for the processes at steps S13 to S16, the image transmitting apparatus 100 may transmit a transmission ready notification to the information processing apparatuses 200 in any order. The order of transmitting a data transmission ready notification may not be identical to the order of receiving an image data transmission request (and a reading condition). An image data transmission request may have been received from any of the information processing apparatuses 200 before an image data transmission ready notification is transmitted to all information processing apparatuses 200.

Also, as for the processes at steps S25 to S34, the process for any of the information processing apparatuses 200 may be performed first. Furthermore, the image data or image data transmission suspension notification may be transmitted to the next image processing apparatus 200 before receiving a response from any of the information processing apparatus 200.

Figure 5A:
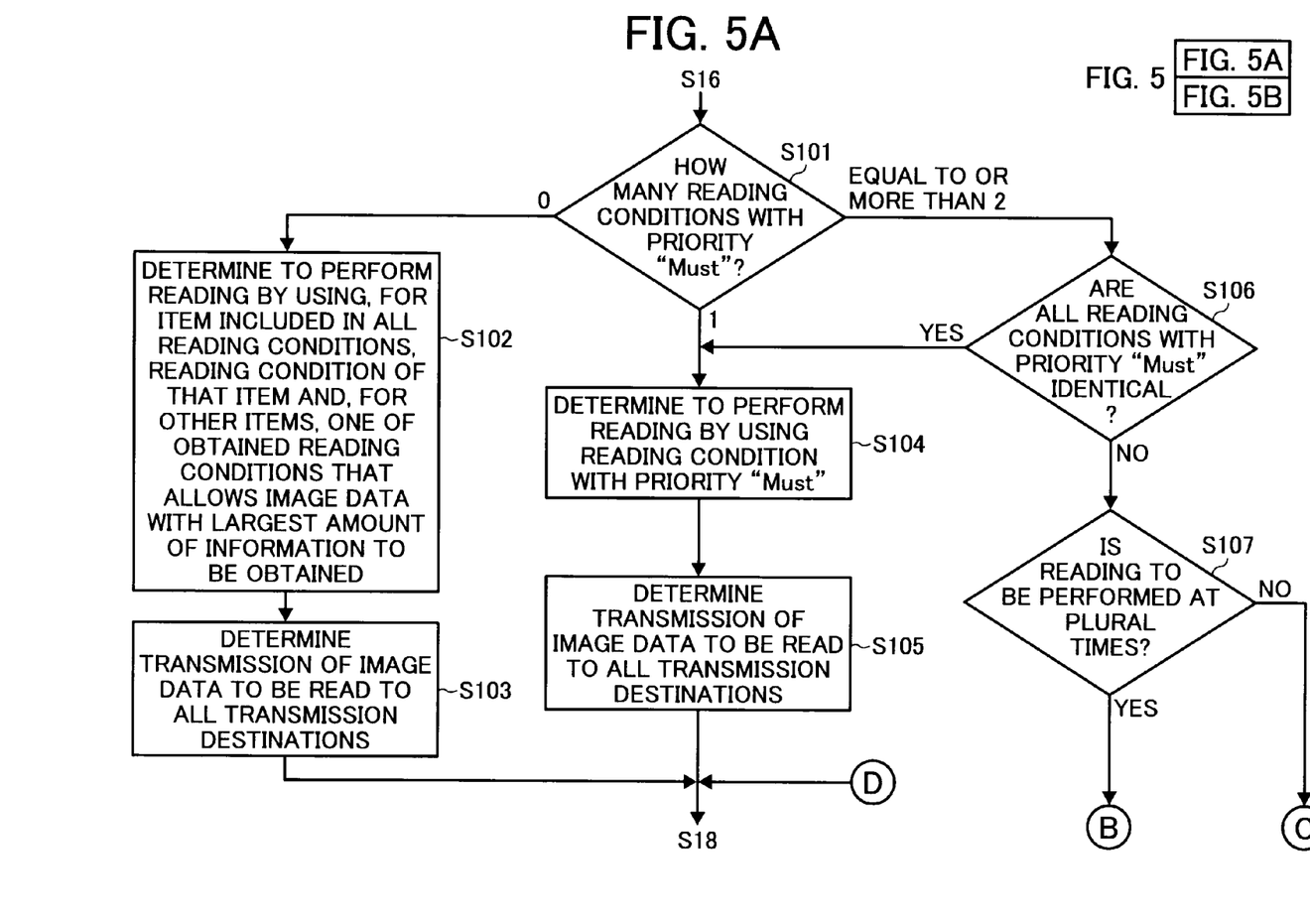
FIG. 5 is a flowchart of a process to be performed by the CPU of the image transmitting apparatus at step S17 of FIG. 3.
Figure 5B:
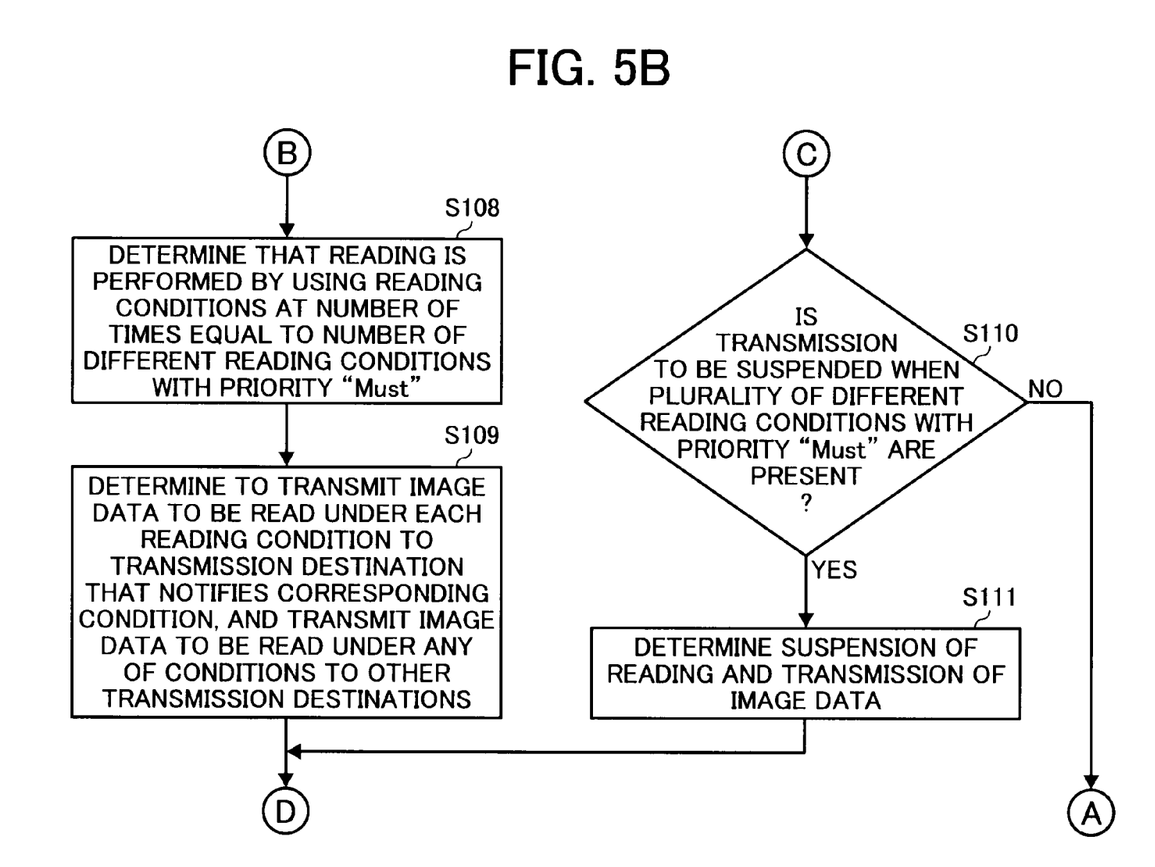
Figure 6:
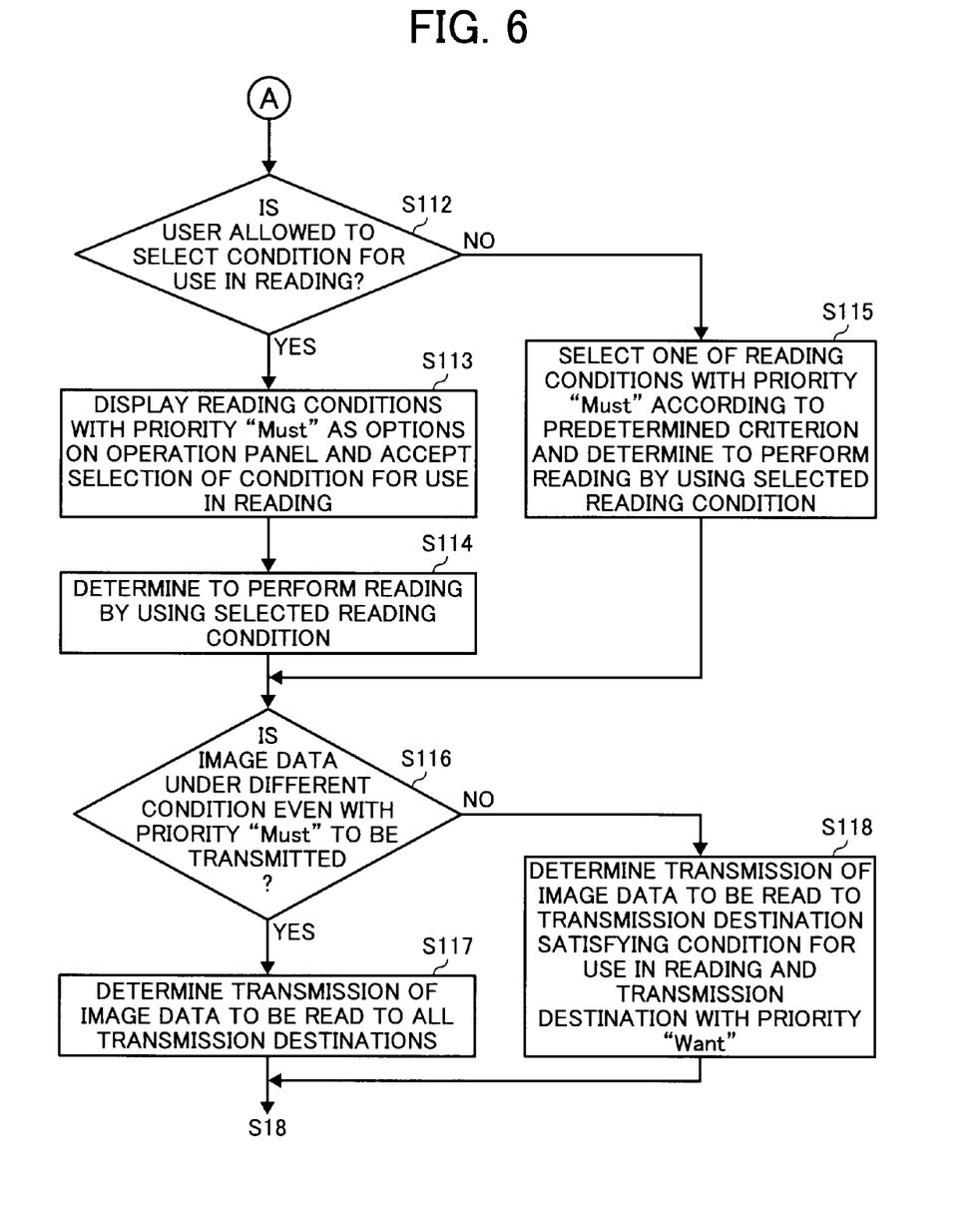
FIG. 6 is the flowchart of the process continued from FIG. 5.

FIGS. 5 and 6 is a flowchart of a process to be performed by the CPU 101 of the image transmitting apparatus 100 at step S17 of FIG. 3.

The CPU 101 of the image transmitting apparatus 100 starts the process depicted in the flowchart of FIG. 5 upon obtaining the reading conditions from all external apparatuses (here, the information processing apparatuses 200) set as image data transmission destinations at steps S13 to S16 of FIG. 3.

First at step S101, the number of reading conditions with priority "Must" among the reading conditions obtained from the external apparatuses as transmission destinations is counted.

Here, if the number of reading conditions with "Must" is 0, all reading conditions indicate "Want", meaning that following the reading condition is arbitrary. Therefore, any reading condition can be used, and thus an arbitrary one of the reading conditions reported from the transmission destinations can selected for use.

However, since it is considered that it is preferable to follow the reading conditions obtained from each of the external apparatuses as much as possible, the reading condition is determined through a process at step S102. That is, the reading conditions are compared from one another, and it is determined to perform reading by using, for an item included in all of the reading conditions, a reading condition of that item and, for other items, one of the obtained reading conditions that allows image data with the largest amount of information to be obtained. When such reading is determined, the determination at step S18 of FIG. 3 is Yes. The same goes for determination of reading explained below.

Generally, the amount of information of image data is large under a condition where an image is represented more clearly with high image quality. Examples of such a case include the case of a large number of gray-scale levels and the case of a high resolution, that is, a condition where a image data with a larger amount of information can be obtained is in full-color 24 bits rather than monochrome one bit and in a resolution of 600 dots per inch rather than 200 dots per inch. Also, a difference in the amount of information may occur under conditions other than those regarding image quality. For example, if a reading range is specified, image data with a larger amount of information can be obtained from a larger range.

Also, depending on the item, the amount of information of the image data may not be affected therefrom. Examples of such an item include a threshold in the case of binary-value reading and a gamma correction curve. For such an item, an average value or an intermediate value of the reading conditions can be adopted, or a default value previously stored in the image transmitting apparatus 100 can be adopted.

Furthermore, since all reading conditions are those that may be followed arbitrarily, items that affect the amount of information of the image data may be handled in a manner similar to the manner explained above.

After the completion of step S102, the system control is passed to step S103, where it is determined that the image data to be read under the conditions determined at step S102 is transmitted to all transmission destinations. When such a determination is made, the determinations at steps S25 and S30 of FIG. 4 are Yes. The same goes to determination of transmission explained further below.

After the completion of step S103, the system control is passed to step S18 and onward in FIG. 3.

If it is determined at step S101 that the number of reading conditions with "Must" is one, it can be found that the reading condition that must be followed is only that one. Therefore, it is determined at step S104 to perform reading by using that reading condition with priority "Must".

Also, since the other reading conditions reported from the transmission destinations are provided with priority "Want", the image data to be read under the reading condition determined at step S104 can be transmitted. Therefore, it is determined at step S105 that the image data to be read is transmitted to all transmission destinations, and the procedure then goes to step S18 and onward in FIG. 3.

On the other hand, if it is determined at step S101 that the number of reading conditions with "Must" is two or more, the system control is passed to step S106, where the reading conditions with priority "Must" are compared with one another to determine whether they are identical. If the determination is Yes, it can be found that the number of reading conditions that must be followed is substantially one. Thus, the system control is passed to step S104 for performing a similar process to that when the number of conditions is determined at step S101 is one.

If the determination is No at step S106, however, it can be found that reading according to all of the reading conditions with priority "Must" is impossible. Thus, the system control is passed to step S107, where it is determined whether reading is to be performed at plural times. This determination can be made according to parameters previously set in the image transmitting apparatus 100.

If the determination at step S107 is Yes, the system control is passed to step S108, where it is determined that reading is performed by using the reading conditions at the number of times equal to the number of different reading conditions with priority "Must". That is, reading at plural times is determined.

Furthermore, it is determined at the next step S109 that image data read under each of the reading conditions determined at step S108 is transmitted to a relevant one of transmission destinations that has notified the corresponding condition (a transmission destination that has notified a reading condition with priority "Must") and image data to be read under any of the conditions is transmitted to other transmission destinations. Arbitrary criteria of "any of the conditions" may be adopted, such that a condition as similar as possible to the notified condition is selected, a condition allowing the image data with an amount of information as large as possible is selected, priority can be set for each item when selecting, or a condition scheduled to be used for the first reading is simply selected.

After the completion of step S109, the system control is passed to step S18 and onward in FIG. 3.

If it is determined at step S107 as No, the system control is passed to step S110, where it is determined whether transmission is to be suspended when a plurality of different reading conditions with priority "Must" are present. This determination may be made by referring to the settings in the image transmitting apparatus 100 performed in advance, or by displaying a popup screen on the operation panel to request a user for an instruction and then following the instruction.

If the determination at step S110 is Yes, the system control is passed to step S111, where suspension of reading and transmission of the image data is determined, and then the system control is passed to step S18 and onward in FIG. 3. In this case, the determination at step S18 is No.

On the other hand, if the determination at step S110 is No, the system control is passed to step S112 in FIG. 6, where it is determined whether the user is allowed to select a condition for use in reading. This determination can be performed by referring to the settings in the image transmitting apparatus 100 performed in advance.

If the user is allowed to select, the system control is passed to step S113, where reading conditions with priority "Must" obtained from the transmission destinations are displayed as options on the operation panel 105, and a selection of a condition for use in reading is accepted. Then, if a selection is made, the system control is passed to step S114, where reading by using the selected reading condition is determined.

At step S113, the reading conditions to be displayed can be only those that are important, such as resolution, the number of colors, and size. Also, not only the reading conditions but also identification information (such as name and address) of the transmission destinations that have notified the conditions may be displayed. Also, not only those with priority "Must" but also those with priority "Want" may be displayed as options. In this case, these options are preferably displayed with their priorities of the reading conditions.

Alternatively, suspension of transmission may be selected at the stage of step S113 and the procedure may go to step S111.

If the determination at step S112 is No, the system control is passed to step S115, where one of the reading conditions with priority "Must" obtained from the transmission destinations is selected according to a predetermined criterion, and reading by using that reading condition is determined. The predetermined criterion may be such that simply the first-obtained condition is selected, but may be such that selection is made according to a certain priority previously set in the image transmitting apparatus 100.

At this time, the criteria may be such that selection is made not only from the reading conditions with priority "Must" but also from the reading conditions with priority "Want".

After steps S114 and 115, the system control is passed to step S116, where it is determined whether the image data under a different reading condition even with priority "Must" is to be transmitted. The determination at step S116 can also be made by referring to the settings previously performed in the image transmitting apparatus 100.

If the determination at step S116 is Yes, the system control is passed to step S117, where it is determined that the image data obtained through reading is to be transmitted to all transmission destinations, and the procedure then goes to step S18 and onward in FIG. 3. If the determination at step S116 is No, on the other hand, the system control is passed to step S118, where it is determined that the image data obtained through reading is transmitted to a transmission destination satisfying the condition for use in reading and a transmission destination that has notified a reading condition with priority "Want".

A reason for performing such a process is that, an inconvenience may occur if image data read under a condition different from the reading condition with "Must" set in an external apparatus is transmitted to that external apparatus.

After steps S117 and S118, the system control is passed to step S18 and onward in FIG. 3.

Figure 7:
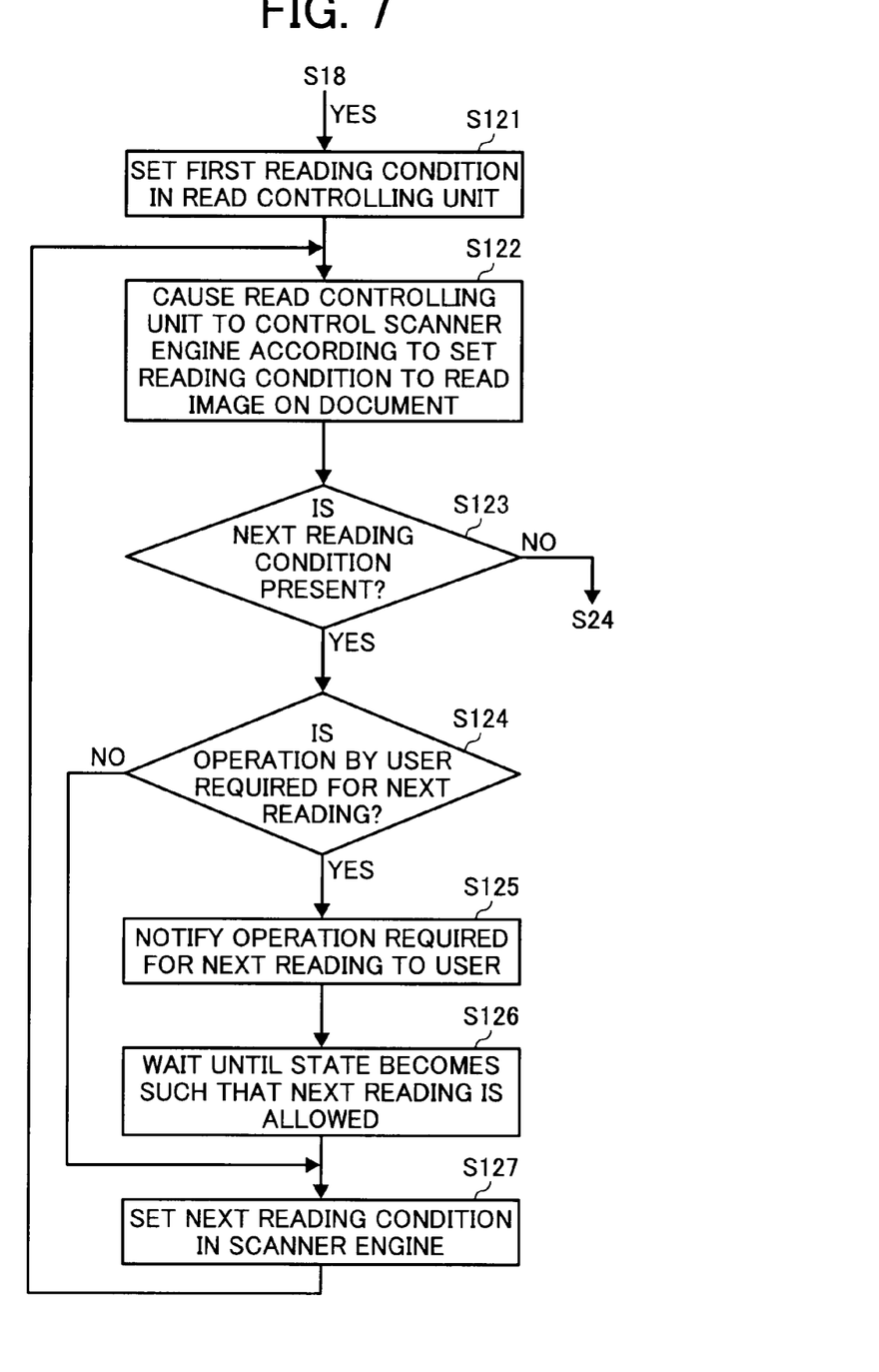
FIG. 7 is a flowchart of a process to be performed by the CPU of the image transmitting apparatus at step S19 of FIG. 3.

FIG. 7 is a flowchart of a process performed at step S19 of FIG. 3 by the CPU 101 of the image transmitting apparatus 100.

The CPU 101 of the image transmitting apparatus 100 starts the processes of the flowchart in FIG. 7 when determining at step S18 of FIG. 3 that reading of image data is performed.

First at step S121, the first reading condition of the reading conditions determined at step S17 for use in reading is set in the read controlling unit 132. Then at step S122, the read controlling unit 132 is caused to control the scanner engine 107 according to the set reading condition to read the image on the document. Even if a plurality of pages of the document is read, all pages are read through this process.

After the completion of reading, the system control is passed to step S123, where it is determined whether the next reading condition is present. If reading with only one reading condition is determined in the process at step S17 of FIG. 3 (that is, the processes depicted in FIGS. 5 and 6), this determination is always No. If No at step S123, the system control is passed to step S20 and onward in FIG. 4.

On the other hand, if the determination at step S123 is Yes, it can be found that reading is to be performed again. Therefore, the system control is passed to step S124, where it is determined whether an operation by the user is required for the next reading. For example, if the document has been placed on a contact glass and only the movement of a carriage provided at a reading unit is required for the next reading, no operation by the user is required. If an ADF (automatic document feeder) is used and the document has to be moved manually from a paper delivery unit to a document placing unit for the next reading, an operation by the user is required. Here, an operation by the user is assumed to be required even when an operation on a button for the next reading is required.

If the determination at step S124 is Yes, the system control is passed to step S125, where the operation required for the next reading is notified the user by, for example, being displayed on the operation panel 105. In this case, the display controlling unit 122 functions as a unit of notifying to the user. If a plurality of stages of operation is required, every time an operation at a certain stage is performed, an operation at the next stage may be reported. After step S125, the procedure waits at step S126 until the state becomes such that the required operation is performed by the user to allow the next reading. When the state becomes such that the next reading is allowed, the next reading condition is set in the read controlling unit 132 at step S127, and then the procedure returns to step S122 for repeating the processes.

If the determination at step S124 is No, the procedure directly goes to step S127 for the subsequent processes.

The image transmitting apparatus 100 that performs the processes and operations explained in the foregoing can perform an appropriate operation in consideration of the reading conditions even if these reading conditions set among the transmission destination apparatuses are not coincided with one another.

More specifically, if a plurality of different reading conditions with priority "Must" are included in the reading conditions obtained from the image data transmission destinations, any of these can be used as a reading condition for the image data to be transmitted. Therefore, in any cases, to at least one transmission destination, the image data according to the reading condition with "Must" can be transmitted.

Also, the read image data can be transmitted only to the transmission destination that has transmitted the reading condition coinciding with the reading condition for use in reading and the transmission destination that has transmitted the reading condition with priority "Want". Therefore, a situation can be avoided such that image data contradictory to the reading condition with "Must" is transmitted to cause an inconvenience.

Furthermore, if a plurality of different reading conditions with priority "Must" is included in the reading conditions obtained from the image data transmission destinations, the image data to be transmitted is repeatedly read at the number of times equal to the number of different reading conditions by using the respective reading conditions. Therefore, it is possible to follow the requests from all transmission destinations.

When reading is performed at a plurality of times, if an operation required to perform the reading at the times is reported to the user, a situation can be avoided such that the user fails to perform the required operation or cannot understand how to perform the required operation to suspend reading.

Here, irrespectively of whether the priority indicates "Must" or "Want", reading may be performed at times equal to the number of different reading conditions. With this, the condition with "Want" can be always followed, which is conducive to the convenience of the user at the transmission destination. However, this may increase a load of the comparing process or time and effort required for reading due to an increase in the number of times of reading, thereby leading to a decrease in convenience of the user of the image transmitting apparatus. Therefore, only the reading by using the condition with "Must" is performed herein.

Still further, in the image transmitting apparatus 100, if the reading conditions obtained from the image data transmission destinations include a plurality of different reading conditions with priority "Must", image data transmission may be suspended. Therefore, also in this point, a situation can be avoided such that image data contradictory to the reading condition is transmitted to cause an inconvenience at the transmission destination. In the case where an inconvenience will occurs if transmission is performed only to part of the apparatus satisfying the condition, such as the case where information is desired to be broadcasted, suspending the image data transmission is effective.

Still further, if the reading conditions obtained from the image data transmission destinations do not include a reading condition with priority "Must", as a reading condition for the image data to be transmitted, for an item included in all of the obtained reading conditions, that item is used and, for the other items, any of the obtained reading conditions can be used. Therefore, even if the priority indicates "Want", image data that follows a condition as similar as possible to the condition set in the transmission destination is transmitted, thereby satisfying the request from the user of the transmission destination.

Also in this case, as for the item not included in all reading conditions, a condition allowing image data with the largest amount of information to be obtained is used from among the reading conditions. This can give the image data receiving side more discretion in processing the image data to obtain data under a desired condition.

The explanation of the embodiments is now completed. In the embodiments explained in the foregoing, as a matter of course, the configuration of the apparatuses and system, specific processing, communication procedure, data format are not meant to be restricted to those explained in the embodiments.

For example, in the embodiments, it is determined at step S106 of FIG. 5 whether the reading conditions with priority "Must" are identical. Alternatively, even if these conditions are not exactly identical, if the image data is allowed to be modified, reading may be performed with such a modification as a precondition.

In this case, the reading conditions for use in reading are preferably such that, for an item included in all of the reading conditions with priority "Must", the reading condition for that item is used and, for other items, a condition allowing image data with the largest amount of information to be obtained is used. In this case, when the image data is transmitted to the transmission destination that has notified the reading condition with priority "Must" that is different from the reading condition for use in reading, the image data is modified to follow the condition reported from that transmission destination.

For example, if the reading conditions reported from the transmission destinations include "monochrome one bit" and "full-color 24 bits" as for the specification of the number of colors, the document is read with "full-color 24 bits", and then color information in the image data obtained through reading is decreased, thereby obtaining image data that would be obtained through reading with "monochrome one bit". Therefore, "full-color 24 bits" is used as the reading condition, and when the image data is transmitted to the transmission destination that has notified the condition of "monochrome one bit", color information in the read image data is decreased for transmission.

In this manner, even if the reading conditions set in the transmission destinations are varied, the possibility of transmitting the image data can be increased, thereby further increasing the convenience of the image transmitting apparatus.

Here, depending on the reading conditions reported from the transmission destinations, the size of the image data obtained through reading may be extremely large to cause memory shortage even if transmission is theoretically possible with modification of the image data. To avoid this, the size of the image data to be obtained through reading is estimated from reading conditions required for satisfying all of the reading conditions with priority "Must", and if the size is expected to exceed a predetermined reference value, the determination at step S106 is made as No.

Also at step S102 of FIG. 5, if the reading condition is set according to the criteria explained in the embodiments, the size of the image data may be too large, thereby causing shortage of memory capacity or a communication overload at the time of transmission. To avoid this, the size of the image data to be obtained is estimated from reading conditions to be use for reading, and if the size is expected to exceed a predetermined reference value, the conditions for part of the items may be changed so that the size of the image data is decreased.

Still further, irrespectively of whether the priority indicates "Must" or "Want", if the reading condition reported from the transmission destination is different from the reading condition for use in reading, if transmission is possible with modification of the image data, the image data may be modified before transmission so that the condition coincides with the reported reading condition as much as possible, and then may be transmitted.

Still further, in the embodiment explained above, the image transmitting apparatus 100 proceeds to the process of determining the condition for use in reading and other processes after obtaining the reading conditions from all of the apparatus set as transmission destinations. However, for a transmission destination that does not report a reading condition within a predetermined period after an image data transmission ready notification is transmitted, transmission to this transmission destination may be ignored, and subsequent processing may be performed. The transmission destination apparatus continues monitoring image data reception until image data is transmitted after returning the reading condition in response to an access from the image transmitting apparatus 100, and if image data is not received within the predetermined period, the transmission destination apparatus may cause the processing to be timed out. Therefore, waiting for a long time after transmission of the image data transmission ready notification is not preferable, and that is why ignoring transmission to the transmission destination as explained above may be possible.

In addition to the above, in the present invention, as a matter of course, the apparatuses as image data transmission destinations are not meant to be restricted to personal computers. Furthermore, communication between the image transmitting apparatus and the transmission destination apparatuses can be performed through an arbitrary communication path, irrespectively of wired or wireless.

Also, the image data to be transmitted by the image transmitting apparatus is not meant to be restricted to data obtained by reading a document at the time of transmission, but may be data read in advance or obtained from another apparatus and then stored in an HDD or the like, as long as the reading conditions of the data can be known. Also, the image data may be image data obtained through a measure other than document reading, such as shooting with a camera.

Furthermore, the present invention may be applied to a data transmitting apparatus that transmits data other than image data. In this case, what is set in the transmitting-side apparatus and the transmission destination apparatus is not restricted to reading conditions, but, more generally, conditions for specifying an environment in which data to be transmitted is obtained.

Still further, the program according to the present invention is a program for causing a computer to control hardware for functioning as an image transmitting apparatus as explained above. The program may be stored in advance in a ROM, an HDD, or the like. Also, a similar effect can be achieved by providing the program as being recorded in a non-volatile recoding medium (memory), such as a compact-disk read-only memory (CD-ROM) or a flexible disk, and then being read by a RAM from the memory for execution by the CPU, or being downloaded from an external device including a recording medium having recorded therein the program or an external device having stored therein the program on a storage unit, such as an HDD, for execution.

The configuration and modification examples explained in the foregoing can be applied in combination as appropriate as long as no contradiction arises.

According to an aspect of the present invention, when a function of obtaining image reading conditions from external apparatuses as an image data transmission destination is provided to the image transmitting apparatus, even if the reading conditions obtained from the transmission destination apparatuses do not coincide with one another, an appropriate operation can be performed. As a result, usability of an image transmitting apparatus can be increased.

According to the image transmitting apparatus or image transmitting apparatus control method of the present invention, when a function of obtaining image reading conditions from an external apparatus as an image data transmission destination is provided to the image transmitting apparatus, even if the reading conditions obtained from the transmission destination apparatus do not coincide with the reading conditions already set on the image transmitting apparatus side, an appropriate operation can be performed. Therefore, usability of the image transmitting apparatus can be increased.

Further effects and modification examples can be derived by the person skilled in the art. The embodiments of the present invention are not meant to be restricted to the specific embodiments as explained above. Therefore, various changes can be made within a range not exceeding the concept of the present invention recited in the attached claims and their equivalents.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image transmitting apparatus comprising:
a reading condition obtaining unit that obtains a respective first reading condition relating to an image from each of a plurality of external apparatuses via a network;
a reading condition determining unit that determines whether a first condition is satisfied that the first reading conditions contain compulsory information indicating compulsory use of that condition and a second condition is satisfied that the first reading conditions are contradicting to each other, and when both the first condition and the second condition are satisfied, sets one of the first reading conditions as a reading condition;
an image reading unit that reads an image under the reading condition set by the reading condition determining unit thereby obtaining image data; and
an image transmitting unit that transmits the image data to at least one of the plurality of external apparatuses,
wherein the image transmitting unit transmits the image data to an external apparatus that has transmitted the first reading condition coinciding with the reading condition set by the reading condition determining unit and an external apparatus that has transmitted the first reading condition provided with arbitrary information indicating that setting the reading condition is arbitrary.

2. The image transmitting apparatus according to claim 1, further comprising a read controlling unit that causes the image reading unit to read the image data for each contradicting condition when both the first condition and the second condition are satisfied.

3. The image transmitting apparatus according to claim 2, wherein the read controlling unit includes a notifying unit that notifies to a user an operation required to perform the reading of the image data.

4. The image transmitting apparatus according to claim 1, wherein when the first condition is not satisfied, the reading condition determining unit determines common items and uncommon items in the first reading conditions, selects appropriate ones of the uncommon items, and creates the reading condition by using the common items and selected uncommon items.

5. The image transmitting apparatus according to claim 4, wherein the reading condition determining unit selects those uncommon items that produce image data with the largest amount of information.

6. An image transmitting apparatus comprising:
- a reading condition obtaining unit that obtains a respective first reading condition relating to an image from each of a plurality of external apparatuses via a network;
- a reading condition determining unit that determines whether a first condition is satisfied that the first reading conditions contain compulsory information indicating compulsory use of that condition and a second condition is satisfied that the first reading conditions are contradicting to each other, and when both the first condition and the second condition are satisfied, sets one of the first reading conditions as a reading condition;
- an image reading unit that reads an image under the reading condition set by the reading condition determining unit thereby obtaining image data;
- an image transmitting unit that transmits the image data to at least one of the plurality of external apparatuses; and
- a transmission suspending unit that suspends transmission of the image data by the image transmitting unit when the first condition is satisfied but the second condition is not satisfied.

7. A method of transmitting an image, the method comprising:
- obtaining a respective first reading condition relating to an image from each of a plurality of external apparatuses via a network;
- determining whether a first condition is satisfied that the first reading conditions contain compulsory information indicating compulsory use of that condition and a second condition is satisfied that the first reading conditions are contradicting to each other;
- setting one of the first reading conditions as a reading condition when it is determined at the determining that both the first condition and the second condition are satisfied;
- reading an image under the reading condition set at the setting thereby obtaining image data; and
- transmitting the image data to at least one of the plurality of external apparatuses,
- wherein the transmitting includes transmitting the image data to an external apparatus that has transmitted the first reading condition coinciding with the reading condition set at the setting and an external apparatus that has transmitted the first reading condition provided with arbitrary information indicating that setting the reading condition is arbitrary.

8. The method according to claim 7, further comprising controlling the reading to read the image data for each contradicting condition when both the first condition and the second condition are satisfied.

9. The method according to claim 8, wherein the controlling includes notifying a user about an operation required to perform the reading.

10. The method according to claim 7, wherein when the first condition is not satisfied, the determining includes determining common items and uncommon items in the first reading conditions, selecting appropriate ones of the uncommon items, and creating the reading condition by using the common items and selected uncommon items.

11. The method according to claim 10, wherein the determining includes selecting those uncommon items that produce image data with the largest amount of information.

* * * * *